United States Patent
Rahim et al.

(10) Patent No.: US 9,405,872 B2
(45) Date of Patent: Aug. 2, 2016

(54) SYSTEM AND METHOD FOR REDUCING POWER OF A CIRCUIT USING CRITICAL SIGNAL ANALYSIS

(71) Applicant: Synopsys, Inc., Mountain View, CA (US)

(72) Inventors: Solaiman Rahim, San Jose, CA (US); Sean Safarpour, San Jose, CA (US); Shekaripuram V. Venkatesh, Los Altos, CA (US); Siddharth Guha, New Delhi (IN); Fahim Rahim, Lyons (FR)

(73) Assignee: Synopsys, Inc., Mountain View, CA (US)

( * ) Notice: Subject to any disclaimer, the term of this patent is extended or adjusted under 35 U.S.C. 154(b) by 11 days.

(21) Appl. No.: 14/600,234

(22) Filed: Jan. 20, 2015

(65) Prior Publication Data

US 2015/0356222 A1  Dec. 10, 2015

Related U.S. Application Data

(60) Provisional application No. 62/009,275, filed on Jun. 8, 2014.

(51) Int. Cl.
*G06F 17/50* (2006.01)

(52) U.S. Cl.
CPC ........ *G06F 17/5031* (2013.01); *G06F 2217/06* (2013.01); *G06F 2217/08* (2013.01); *G06F 2217/78* (2013.01); *G06F 2217/84* (2013.01)

(58) Field of Classification Search
CPC .................................................. G06F 2217/78
USPC .......................................... 716/109, 132, 133
See application file for complete search history.

(56) References Cited

U.S. PATENT DOCUMENTS

| | | | |
|---|---|---|---|
| 5,446,676 A | 8/1995 | Huang et al. | |
| 5,625,803 A | 4/1997 | McNelly et al. | |
| 5,692,160 A | 11/1997 | Sarin | |
| 5,838,947 A | 11/1998 | Sarin | |
| 7,188,263 B1 * | 3/2007 | Rubinstein | G06F 1/3209 713/300 |
| 7,882,461 B2 * | 2/2011 | Jiang | G06F 17/5031 323/284 |
| 8,266,569 B2 | 9/2012 | Palisetti et al. | |
| 8,423,843 B2 | 4/2013 | Allen | |
| 8,452,581 B2 | 5/2013 | Sundaresan et al. | |
| 8,694,955 B2 * | 4/2014 | Hasslen | G06F 17/5022 717/104 |
| 2006/0277509 A1 | 12/2006 | Tung et al. | |
| 2011/0072412 A1 * | 3/2011 | Hasslen | G06F 17/5022 717/106 |
| 2011/0161899 A1 | 6/2011 | Ginetti et al. | |
| 2011/0161900 A1 | 6/2011 | Ginetti et al. | |
| 2012/0017100 A1 * | 1/2012 | Petit | G06F 1/3203 713/300 |
| 2013/0212545 A1 | 8/2013 | Allen | |
| 2015/0095009 A1 * | 4/2015 | Brock | G06F 17/5009 703/21 |
| 2015/0095010 A1 * | 4/2015 | Brock | G06F 17/5009 703/21 |

* cited by examiner

*Primary Examiner* — Stacy Whitmore
(74) *Attorney, Agent, or Firm* — Fenwick & West LLP

(57) ABSTRACT

A system and methods provide for an analysis of at least a portion of an integrated circuit (IC) that comprises a plurality of modules, for the purpose of identifying signals that can be indicative of the activity of the modules. By analyzing the activity of these signal immediately before and immediately after each module going from non-idle to idle and from idle to non-idle respectively, it is possible to determine which signals provide an indication that the module should be shut down. If the module can be shut down in idle state, then these input signals may be used as control signals for this purpose. By reporting to a designer the role of such signals a simple design change for detecting the activity and controlling the module, can save on power consumption, in ways not previously detected by the designer.

24 Claims, 4 Drawing Sheets

SYSTEM AND METHOD FOR REDUCING POWER OF A CIRCUIT USING CRITICAL SIGNAL ANALYSIS

CROSS-REFERENCE TO RELATED APPLICATION

This patent application claims priority under 35 U.S.C. 119(e) from prior U.S. provisional application No. 62/009,275, filed on Jun. 8, 2014.

TECHNICAL FIELD

The present invention relates to the field of circuit design, and more particularly to analysis of circuits for the purpose of determinations of ways to reduce power consumption of the circuit, and even more particularly in integrated circuit design.

BACKGROUND ART

Power consumption is a major consideration in integrated circuit (IC) design. In circuits containing millions of transistors there are many control signals, some of which are used by the designers of the circuits to reduce the power consumption of sub-circuits or even the entire IC. Certain control signals are known in advance of the design and as such are used to enable or disable the circuit or portions thereof from clocking while idle and thereby power consumption is reduced. Such control signals are generally referred to as critical signals. That is, a critical signal is a signal which controls the activity of this module. When the signal toggles, the module starts its processing and its activity increases.

For instance, critical signals can be found when there is a control unit that sends start and end signals to a processing element. This can also be the case when a first-in first-out (FIFO) circuit is used for synchronization. There will be signals from the FIFO circuit controlling one or more modules to read data from it. These signals are critical as they will trigger activity in the module. While a designer of a circuit may take precautions in an attempt to prevent missing such critical signal, this may be a daunting task when circuits containing millions of transistors are involved and each designer concentrating on the design of only a much smaller portion of the overall IC. While certain signal such as clocks or enable signals may be identified by the designer as critical signals, and handled as such, it is easy to miss interactions between modules and sub-circuits and thereby lose opportunities for significant power reductions.

It would therefore be advantageous to provide a solution that identifies critical signals that can provide power savings if handled properly. It would be advantageous if the solution can provide indications for savings that do not require the finer granularity power savings provided by techniques involving stability condition (STC) and observability don't-care (ODC) analysis.

SUMMARY DISCLOSURE

A system (such as a computer-aided design system) and a computerized method are provided for determining candidate signals in a received integrated circuit (IC) design, wherein those candidate signals may be used to control power consumption and thereby achieve power consumption reduction of the IC. The system comprises at least one processing unit and a memory connected to the processing unit(s) that contains program instructions therein, wherein the execution of those instructions by the processing unit configure the system to perform the steps of the computerized method.

In particular, in the method performed by the system, a description of at least a portion of the IC is first received and can be stored in the memory for access by the processing unit(s). The received circuit description is partitioned into a plurality of specified circuit modules (CMs). This partitioning of the described circuit into CMs can be pre-partitioned as received, or be partitioned or re-partitioned by the system processing unit(s) in accord with program instructions. In either case, the processing unit performs a power consumption simulation of the IC from the received description so as to generate a power consumption time series for each CM, and then performs an analysis of the generated power consumption time series so as to identify the existence of any one or more idle periods for each CM.

Next, selecting any CM having at least one idle period that is above a predetermined threshold value, the processing unit performs an analysis on all the input signals of each selected CM so as to determine at least one input signal of all selected CM's input signals that are correlated to transitions of such selected CM between its idle and non-idle states. Transitions include both the entrance of a selected CM into an idle state, i.e. a non-idle to idle transition, and also the entrance of a selected CM into a non-idle state, i.e. an idle to non-idle transition. In selecting a CM, the system may generate for each flip-flop of the CM an activity signal being an exclusive OR function (XOR) of an input and output respective of that flip-flop, generate a CM activity signal that is a NOR of the activity signals of the CM, and determine any period where the CM activity signal is idle. Idle periods for each CM may be determined by a CM being idle for at least some specified period of time. For example, the system may determine the existence of period of a first point in time of a power consumption decrease above a first predetermined threshold, and determine the existence of a second point in time subsequent to the first point in time of a power consumption increase to above a second predetermined threshold. Correlations to transitions of a selected CM may be determined by an activity of at least one input in a period of time immediately preceding a transition between idle and non-idle states. (The period of time used here can be a programmable value of the computerized method.) The determined at least one input signal for each CM may be saved in the memory for future use and can also be displayed on a display of the system. In one embodiment a partition contains flip-flops sharing the same clock.

The method may also receive a specified peak activity threshold value of each CM, and identify whether the peak activity threshold value is exceeded at any time period of the power consumption simulation. It may then report each time period where the at least one CM of the IC exceeds the peak power threshold value.

DETAILED DESCRIPTION

A system and method in accord with the present invention provide for an analysis of at least a portion of an integrated circuit (IC) that comprises a plurality of modules, for the purpose of identifying signals that can be indicative of the activity of the modules. By analyzing the activity of these signal immediately before and immediately after each module going from non-idle to idle and from idle to non-idle respectively, it is possible to determine which signals provide an indication that the module should be shut down. If the module can be shut down in idle state, then these input signals may be used as control signals for this purpose. By reporting to a designer the role of such signals a simple design change for detecting the activity and controlling the module, can save on power consumption, in ways not previously detected by the designer.

Figure 1:
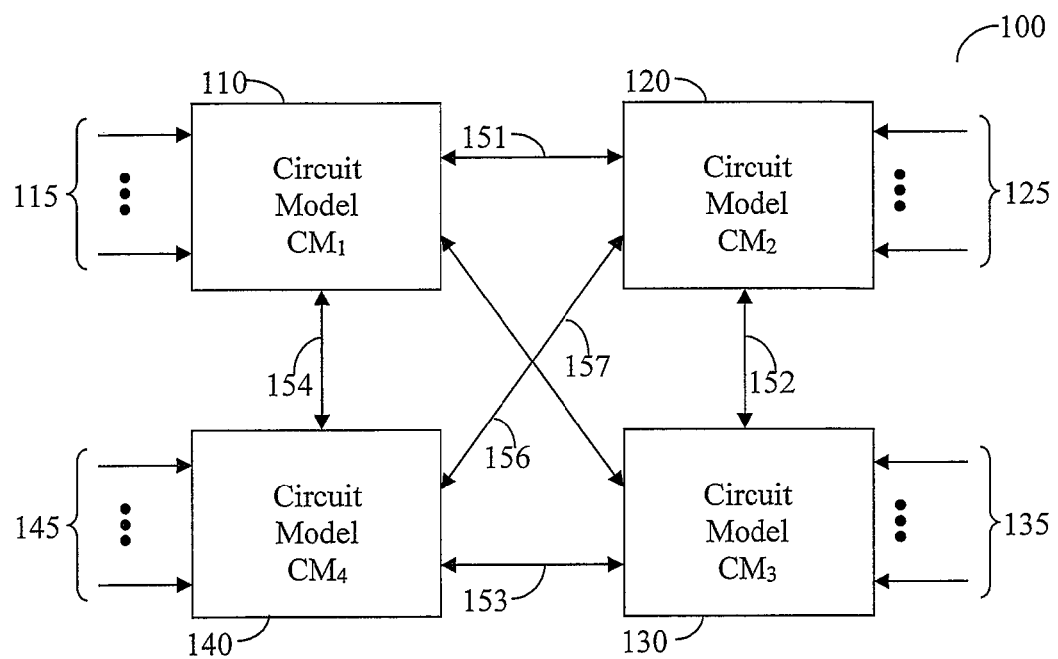
FIG. 1 is a circuit block diagram used to explain an embodiment.

Reference is now made to FIG. 1 where an exemplary and non-limiting circuit block diagram 100 partitioned into four circuit modules (CMs) used to explain an embodiment is shown. The circuit block diagram 100 comprises of four CMs, CM1 110, CM2 120, CM3 130 and CM4 140. Each of the circuit modules CM1 110, CM2 120, CM3 130 and CM4 140 receives respective external input signals referred generally as 115, 125, 135 and 145 respectively. It should be noted, however, that each may have a different number of input signals and in fact, a circuit module may have no external inputs at all, it is connected internally only. In addition, the circuit modules may receive internal input signals from one or more of the other circuit modules, referred to as internal input signals 151 through 156, each representing any number of signals. In certain embodiments, one or more of the CMs may not be connected to any of the other CMs of the circuit 100. It should be however, understood, that for the circuit 100 to function there needs to be at least one external input. The various circuit modules may be operative at any given time and may further move between idle and non-idle states over time, where an idle state is defined as a state where the activity of the partition excluding the clock tree activity is essentially zero. It should be noted that the circuit module partitioning may be based on the actual partitioning provided by a designer, but may not be limited thereto. Other partitions of a circuit into a plurality of circuit modules are possible and therefore is in within the scope of the embodiment. In one embodiment a partition contains flip-flops sharing the same clock. This would be the case where despite an arbitrary design partition another partition is possible where portions of circuits from one partition and portions of circuits from another partition form a circuit module. While the circuit module may be a module, it may be a portion thereof, or a combination of modules, or a combination of portions of modules.

Figure 2:
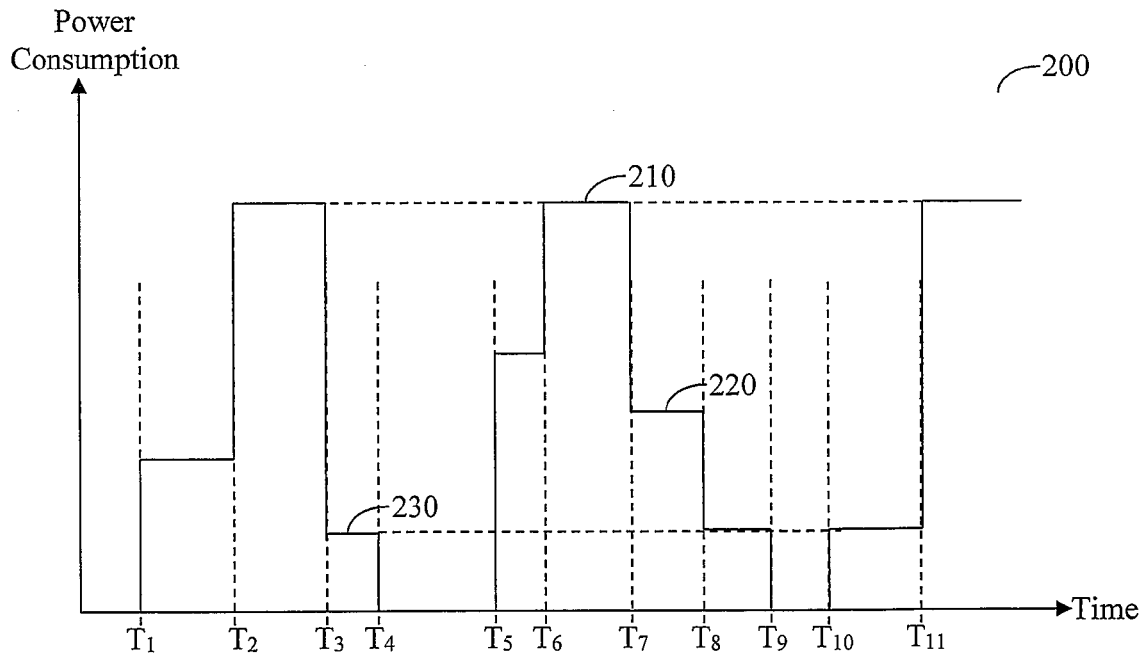
FIG. 2 is a graph of power consumption by a circuit module of a circuit module of the circuit shown in FIG. 1.

According to an embodiment of the invention a power simulation is performed to assess the power consumption over time for each of the circuit module, e.g., CM1 110, CM2 120, CM3 130 and CM4 140. As a result a time series of the activity for each of the circuit modules is provided. An exemplary and non-limiting activity graph for a circuit module, for example, CM1 110, is shown in FIG. 2 which depicts a power consumption graph 200. As can be seen in FIG. 2, there are periods of full circuit activity 210 of CM1110, at the time periods between T2 to T3, T6 to T7 and from T11 onwards. There are further idle activity 240 of CM1110, at the time periods before T1, T4 to T5 and T9 to T10. In addition there are several cases of activity that is in between full activity and idle activity, shown, for example, by activity levels 220 and 230. It can be further seen that the activity level 230 appears repeatedly in graph 200. According to an embodiment, for time period where the CM1110 is idle a control signal associated with going into idle mode is sought and used to clock gate CM1110 in order to save on power consumption. According to another embodiment cases that appear to repeat, such as the case shown for power level 230 occurring in time periods T3 to T4, T8 to T9 and T10 to T11 may provide indication that while a portion of CM1110 is active other portions may be inactive. It would be therefore desirable to identify such cases, find a control signal, and use such a control signal for clock gating and inactivate portions of the circuit not supposed to be active. According to one embodiment the occurrence of such situations is simply reported, however, in another embodiment, the sub circuit of CM1110 that idles is identified and clock gated.

It should be noted that according to an embodiment circuit modules that are quite often idle are the one to be sought for power consumption savings. This is because of the desire to save power by clock gating the circuit module during its idle periods. In another embodiment it is possible to perform activity surge detection using cumulative moving average (CMA) of the activity. There are several detection criteria available, and they are based on comparing the previous CMA to the current CMA. At each point in time a current value of the moving average is kept and compared to a previous value of the moving average. When the difference between both values reaches a certain threshold (for example the increase is bigger than a certain limit), an event is detected. A zero detect or moving average detect may be further used in combination depending on the sensitivity needed for a particular IC. In such a case, regardless of the method chosen, it the events occurring in the middle of an active period (e.g., those occurring in time periods between T1 to T2, T3 to T4, T5 to T6, etc.) are not interesting since it is sought to clock gate the circuit module as a whole.

Once the circuit modules that are candidates for clock gating are identified it is necessary to determine which signals causes entering an idle state. This can be done by analyzing the input signals to each circuit module being considered for clock gating, and examining the recent activity of a given set of input signals. In one embodiment these input signals are selected from a predetermined set of input signals. Such signals are candidates to be identified as critical signals for the circuit module. By tracking recent activity of these input signals it is determined which of these signals toggled before the event that has caused the change in power consumption. It should be understood that the length in time of the tracking window may be programmable, according to an embodiment. In one embodiment of the invention a formal identification of a signal to be a critical signal is used. Accordingly, in an identified module each flip flop provides a tracing activity signal that has the function act=flop.in XOR flop.out. For the entire module a new output signal is added which is a NOR function of all of the tracing activity signals of all flip-flops of the module. A formal check can be now performed to validate that during a predetermined timeframe the new output signal is stuck at zero, i.e., the module is in an idle state.

Figure 3:
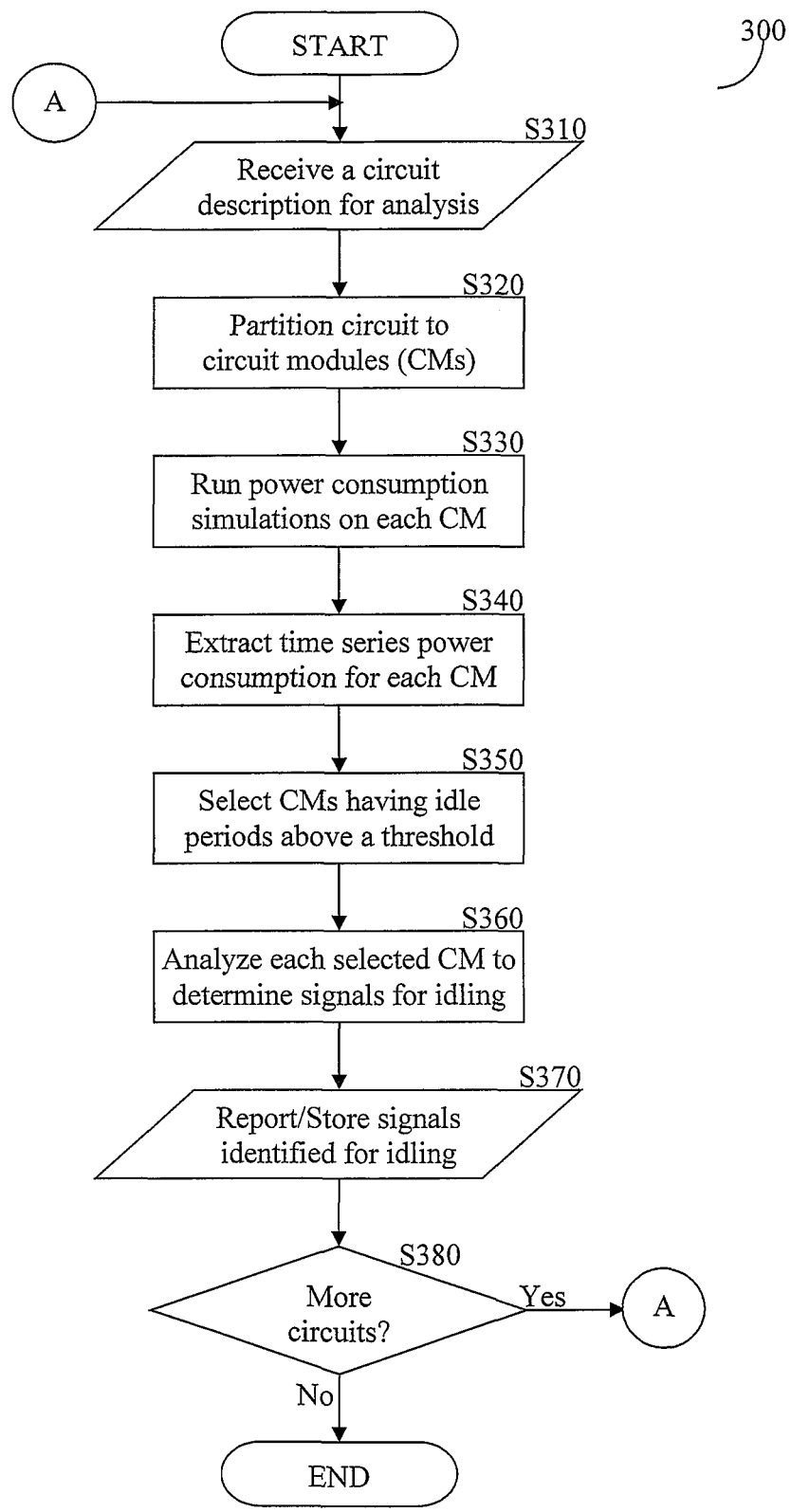
FIG. 3 is a flowchart for determination of input signals having activity before and after an idle state of a circuit module according to an embodiment.

Reference is now made to FIG. 3 that depicts and exemplary and non-limiting flowchart 300 for determination of input signals having activity before and after an idle state of a circuit module according to an embodiment. In step S310, the system receives a circuit description, for example a description of an entire IC or a portion thereof, for analysis. In step S320, the received circuit is partitioned into a plurality of CMs. According to an embodiment the partitioning may be the designed partitioning of the circuit. According to another partitioning the circuit is partitioned into CMs by selecting circuitry based on a set of rules that cause a partitioning of a circuit to a plurality of CMs. In step S330, a power consumption simulation is run for each of the CMs. The power simulation should be sufficiently long in cycles and sufficiently diverse so as to exercise as much of the operation of each CM as possible. In step S340, a time series of the power consumption respective of each CM is extracted from the simulation results. A graph of such a series of result may be, for example, the graph shown in FIG. 2. In step S350, CMs having a number and/or duration of idle periods above a predetermined threshold for further analysis are determined. The determination is made based on reaching an idle state using various criteria, including, for example, threshold values to avoid selection of low-power circuits that may exemplify an abrupt change from idle to non-idle state and vice versa but overall power consumption is low and therefore the power consumption reduction benefit is marginal or negligible. In step S360, each of the selected CMs is analyzed to determine which of its one or more signals can be pointed to as potentially responsible for the CM going into idle or non-idle state. In step S370, all the signals identified as related to entrance to idle or non-idle state are either stored in memory of the system or otherwise reported, for example by using a display of the system. In step S380, it is checked whether additional circuits are to be checked and, if so, execution continues with step S310 again; otherwise, execution terminates.

In one embodiment the analysis performed in step S350 may be more involved and analyzing not only idle situations but also partial idle situations, i.e., cases such as discussed hereinabove with respect of FIG. 2 power consumption level 230. Thresholds may be used to determine the number of times such a case appears, the power consumption tolerance in such cases, the amount of power that may be saved, and more, to determine if it is worthwhile to either identify a portion of a circuit that can be clock gated of a particular CM, and as further explained hereinabove. In step S360, in addition to analyzing idling signals, partially idling signals are also determined.

In one embodiment of the invention a peak power analysis is performed in order to determine if the operation of all of the CMs at the same time can, in one or more periods of time exceed the maximum power allowed by design for the circuit 100. Such cases may be reported, or control signals detected that allow the prevention of such situations from occurring.

Figure 4:
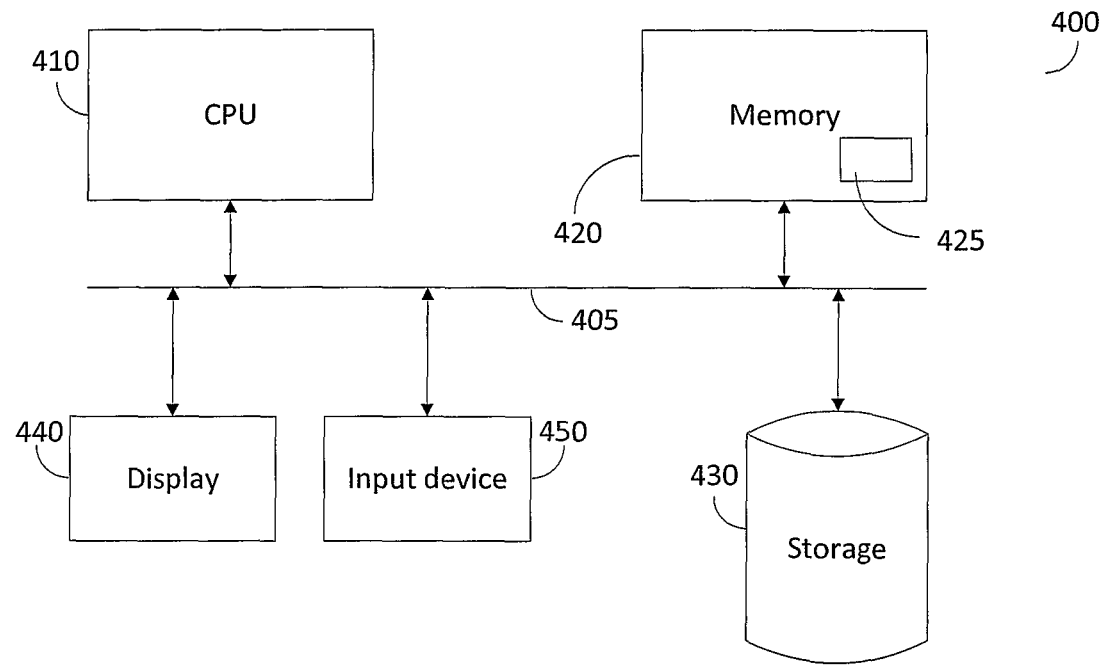
FIG. 4 is a system for IC design that provide enable strengthening to at least a portion of an IC according to an embodiment.

FIG. 4 shows an exemplary and non-limiting system 400, such as a computer aided design (CAD) system, implemented according to the principles of the invention disclosed herein. The system 400 comprises a processing unit 410, for example, one or more central processing units (CPUs), coupled via a bus 405 to a memory 420. The memory 420 further comprises a memory portion 425 used for containing instructions that when executed by the processing unit 410 perform at least the methods disclosed herein. The processing unit 410 may be coupled to a display unit 440, e.g., a computer screen, an input device 450, e.g., a mouse and/or a keyboard, and to a data storage 430. Data storage 430 may be used for the purpose of holding the circuit description upon which the methods described hereinabove are performed and into which the updated circuit, made in accordance with an embodiment, are stored therein. In one embodiment the data storage may be communicatively connected to the bus 505 via a network (not shown). The network may be a local area network (LAN), a wider area network (WAN), a metro area network (WAN), the worldwide web (WWW), the Internet, and any like network, which may be wired or wireless, and in any combination thereof.

Figure 7:
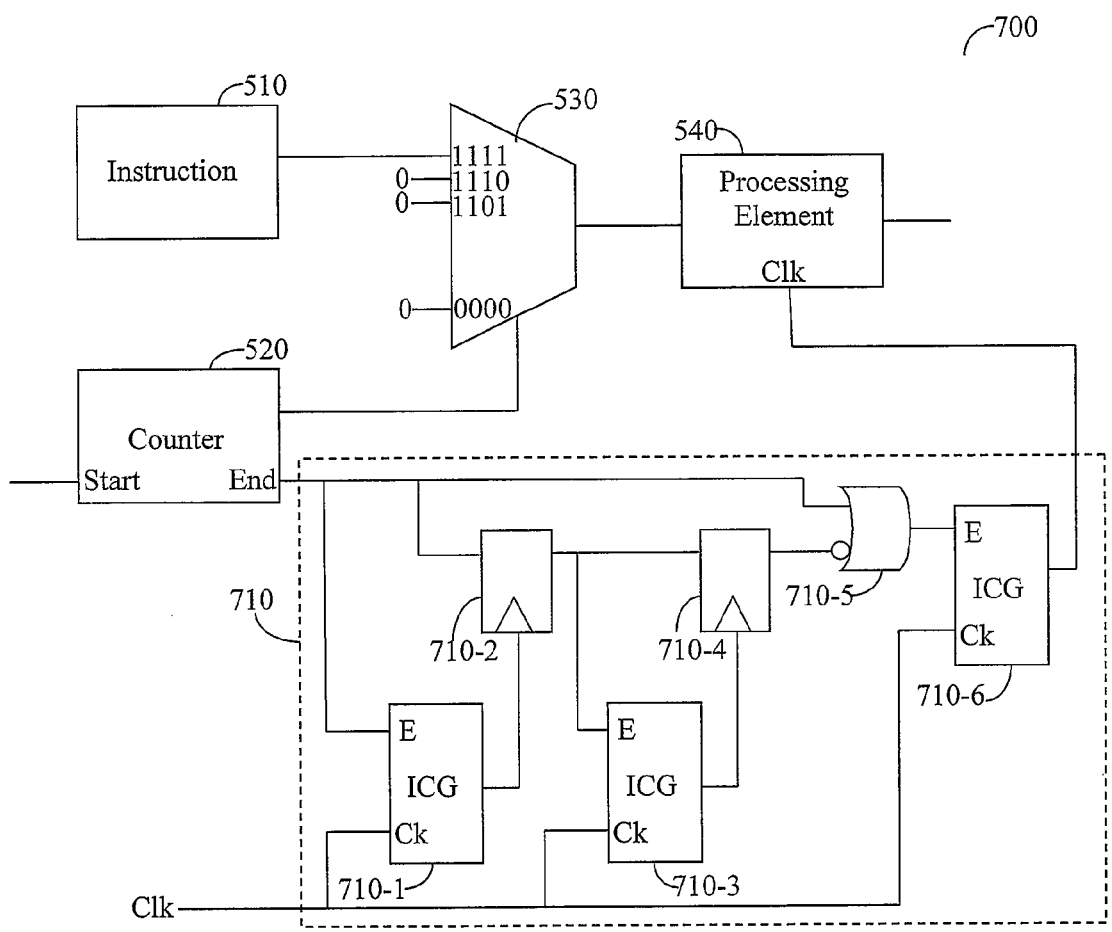
FIG. 7 is the electronic circuit equipped with power reducing control in accordance with the principles of the invention.

Once analysis is performed according to the invention, it may discover that it takes the processing element 540 two cycles to execute the instruction provided. Therefore, the processing element 540 may be shut down only after at least two cycles have passed. FIG. 7 shows an exemplary and non-limiting circuit 700 where to the circuit 600 a control 710 has been added that receives the end signal from the counter 530. The circuit 700 is configured so that Clk of the processing element 540 is not provided directly from the system clock but rather from the output of the control 710. The control 710 is so designed, as would be evident by those of ordinary skill in the art, to cease providing a clock signal to Clk of processing element 540 two cycles after the end signal, for example end signal 620, provided by the counter 520. As a result, instead of the processing element 540 continuing to receive a clock signal and consume power, it is shut down until such time that the process is to restart.

Figure 5:
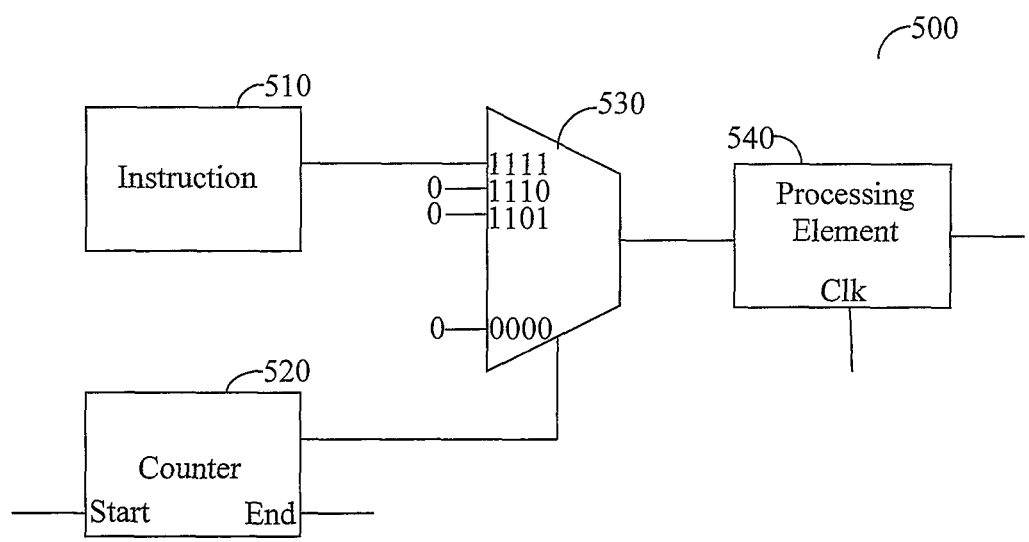
FIG. 5 is a portion of an electronic circuit to be processed in accordance with the principles of the invention.
Figure 6:
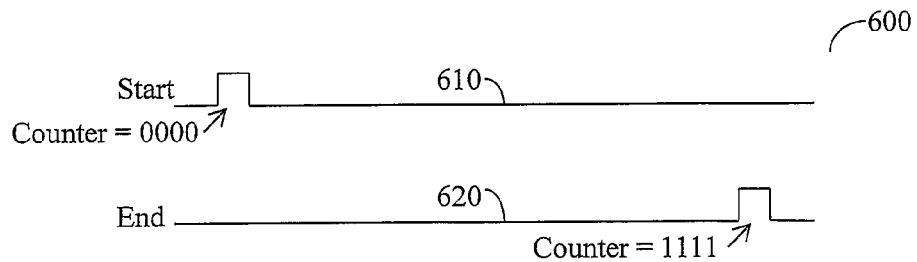
FIG. 6 is a timing diagram corresponding to the electronic circuit to be processed in accordance with the principles of the invention.

FIGS. 5, 6 and 7 are intended to further explain the principles of the invention using an exemplary and non-limiting circuit shown in FIG. 5. The circuit shown in FIG. 5 is the partitioned circuit 500 of S320, of a circuit received for analysis according to S310 as further described in FIG. 3. The partitioned circuit of FIG. 6, shows an interface for providing an instruction 510, a counter 520, enabled to count from 0 to 15 responsive of a start signal and generating an end signal, a multiplexer 530 providing the instruction to a processing element 540 under the control of the counter 520. The processing element 540 operates under the control of a clock, however, one of ordinary skill in the art would appreciate that it may be possible that subsequent to the execution of the instruction provided when the counter reaches 15 (binary 1111), the processing element 540 may be shutdown. This kind of analysis takes place, according to the invention in S330 and S340, shown in FIG. 3. If this circuit has the characteristics allowing for a shutdown it will be selected, S350, and then analyzed, S360, to report signals that may control at idle. In this exemplary case, and as shown in FIG. 6 a start signal 610 begins the count at 0 (binary 0000) as performed by the counter 520, and which upon reaching the value 15 (binary 1111) generates the end signal 620.

Once analysis is performed according to the invention, it may discover that it takes the processing element 540 two cycles to execute the instruction provided. Therefore, the processing element 540 may be shut down only after at least two cycles have passed. FIG. 7 shows an exemplary and non-limiting circuit 700 where to the circuit 600 a control 710 has been added that receives the end signal from the counter 530. The circuit 700 is configured so that Clk of the processing element 540 is not provided directly from the system clock but rather from the output of the control 710. The control 710 is so designed, as would be evident by those of ordinary skill in the art, to cease providing a clock signal to Clk of processing element 540 two cycles after the end signal, for example end signal 620, provided by the counter 520. As a result, instead of the processing element 540 continuing to receive a clock signal and consume power, it is shut down until such time that the process is to restart.

The principles of the invention are implemented as hardware, firmware, software or any combination thereof, including but not limited to a CAD system and software products thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

What is claimed is:

1. A computerized method, implemented in a programmable system having at least a processing unit and a storage, for determination of signals to be used for achieving power consumption reduction of an integrated circuit (IC), the method comprising:
   receiving from storage by the programmable system a description of at least a portion of an IC, the received circuit description comprising a plurality of circuit modules (CMs);
   performing a power consumption simulation of the IC from the received description, by execution of instructions on a processing unit of the programmable system, so as to generate a power consumption time series for each CM;
   performing an analysis of the power consumption time series respective of each CM, by execution of instructions on the processing unit, so as to identify existence of any one or more idle periods for each CM;
   selecting, by execution of instructions on the processing unit, any CM having at least one idle period that is above a predetermined threshold value; and
   performing an analysis on all the input signals of each selected CM, by execution of instructions on the processing unit respective of each selected CM, so as to determine at least one input signal of all selected CM's input signals that are correlated to transitions of such selected CM between its idle and non-idle states.

2. The computerized method of claim 1, wherein idle periods for each CM are determined by a CM being idle for at least some specified period of time.

3. The computerized method of claim 1, further comprises:
   saving in the storage the determined at least one input signal for each CM.

4. The computerized method of claim 1, further comprises:
   displaying on a display the determined at least one input signal for each CM.

5. The computerized method of claim 1, wherein the selecting a CM further comprises:
   determining the existence of period of a first point in time of an activity decrease above a first predetermined threshold; and
   determining the existence of a second point in time subsequent to the first point in time of an activity increase to above a second predetermined threshold.

6. The computerized method of claim 1, wherein the correlation to transitions of a selected CM between idle and non-idle states further comprises:
   determining an activity of at least one input in a period of time immediately preceding a transition between idle and non-idle states.

7. The computerized method of claim 6, wherein the period of time immediately preceding a transition between idle and non-idle states is a programmable value of the computerized method.

8. The computerized method of claim 1, further comprising:
   receiving a specified peak activity threshold value;
   identifying whether the peak activity threshold value is exceeded at any time period of the power consumption simulation.

9. The computerized method of claim 8, further comprises:
   reporting each time period where the at least one circuit of the IC exceeds the peak power threshold value.

10. The computerized method of claim 1, wherein the selecting a CM further comprises:
    generating for each flip-flop of the CM an activity signal being an exclusive OR function (XOR) of an input and output respective of that flip-flop;
    generating a CM activity signal that is a NOR of the activity signals of the CM; and
    determining any period where the CM activity signal is idle.

11. The computerized method of claim 1, wherein partitions of the received circuit description into a plurality of circuit modules (CMs) groups flip-flops sharing a same clock into the same CM.

12. A computer aided design (CAD) system configured to execute the method of claim 1.

13. A system for determining candidate signals to be used to control power consumption of an integrated circuit (IC) comprising:
    at least one processing unit; and
    a memory connected to the at least one processing unit, the memory containing instructions therein that when executed by the at least one processing unit configure the system to: receive a description of at least a portion of the IC, the received circuit description comprising a plurality of circuit modules (CMs); perform a power consumption simulation of the IC from the received description so as to generate a power consumption time series for each CM; perform an analysis of the power consumption time series so as to identify existence of any one or more idle periods for each CM; select any CM having at least one idle period that is above a predetermined threshold value; and perform an analysis on all the input signals of each selected CM so as to determine at least one input signal of all selected CM's input signals that are correlated to transitions of such selected CM between its idle and non-idle states.

14. The system of claim 13, wherein idle periods for each CM are determined by a CM being idle for at least some specified period of time.

15. The system of claim 13, wherein the memory further contains instructions that when executed by the at least one processing unit configure the system to: save in the memory for future use the determined at least one input signal for each CM.

16. The system of claim 13, wherein the memory further contains instructions that when executed by the at least one processing unit configure the system to: display on a display of the system the determined at least one input signal for each CM.

17. The system of claim 13, wherein selection of a CM further comprises instructions that when executed by the at least one processing unit configure the system to:

determine the existence of period of a first point in time of a power consumption decrease above a first predetermined threshold; and determine the existence of a second point in time subsequent to the first point in time of a power consumption increase to above a second predetermined threshold.

18. The system of claim 13, wherein the correlation to transitions of a selected CM between idle and non-idle states further comprises instructions that when executed by the at least one processing unit configure the system to: determine an activity of at least one input in a period of time immediately preceding a transition between idle and non-idle states.

19. The system of claim 18, wherein the period of time immediately preceding a transition between idle and non-idle states is a programmable value of the computerized method.

20. The system of claim 13, wherein the memory further contains instructions that when executed by the at least one processing unit configure the system to:

receive a specified peak activity threshold value; and identify whether the peak activity threshold value is exceeded at any time period of the power consumption simulation.

21. The system of claim 20, wherein the memory further contains instructions that when executed by the at least one processing unit configure the system to: report each time period where the at least one circuit of the IC exceeds the peak power threshold value.

22. The system of claim 13, wherein, when selecting a CM, the memory further contains instructions that when executed by the at least one processing unit configure the system to:

generate for each flip-flop of the CM an activity signal being an exclusive OR function (XOR) of an input and output respective of that flip-flop;

generate a CM activity signal that is a NOR of the activity signals of the CM; and determine any period where the CM activity signal is idle.

23. The system of claim 13, wherein the received circuit description are partitioned into the plurality of circuit modules (CMs) such that flip-flops sharing a same clock are contained within the same CM.

24. The system of claim 13, wherein the system is a computer aided design (CAD) system for design of integrated circuits.

\* \* \* \* \*